Nov. 29, 1960     A. ZOLLINGER     2,962,249
CONSTANT SUPPORT HANGERS
Filed June 12, 1957     2 Sheets-Sheet 1
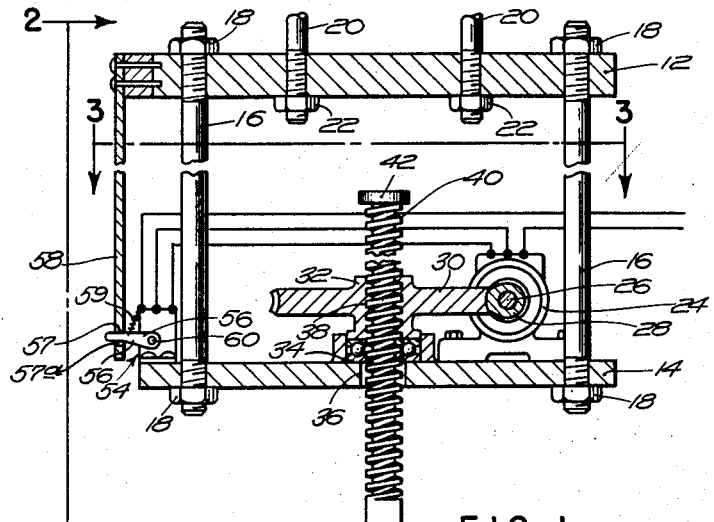
FIG. 1
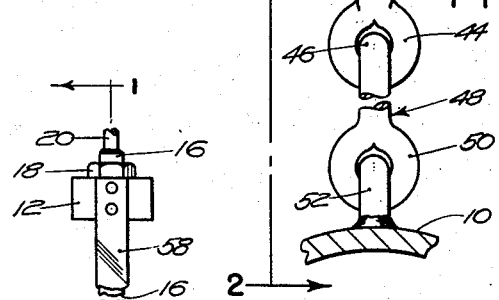
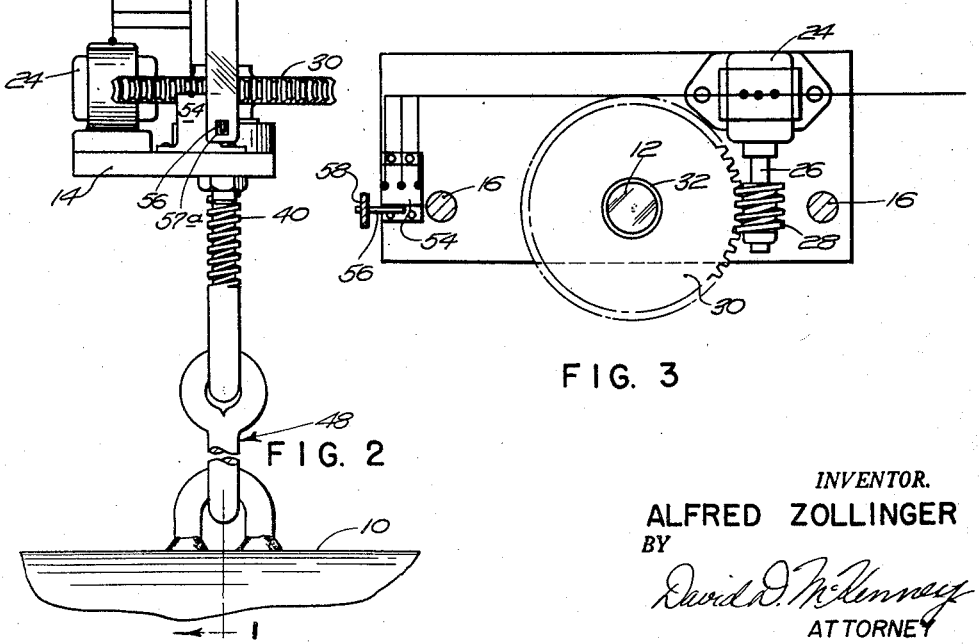
FIG. 2
FIG. 3
*INVENTOR.*
ALFRED ZOLLINGER
BY
*David D. McKenney*
ATTORNEY Nov. 29, 1960    A. ZOLLINGER    2,962,249
CONSTANT SUPPORT HANGERS
Filed June 12, 1957    2 Sheets-Sheet 2
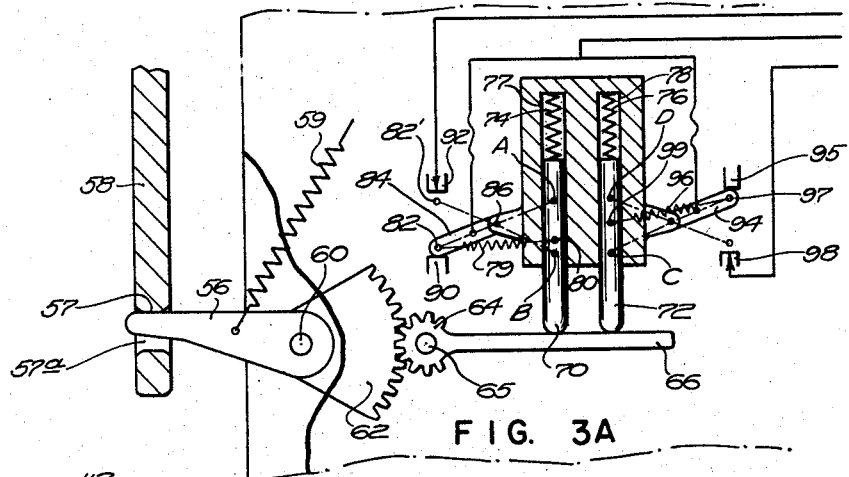
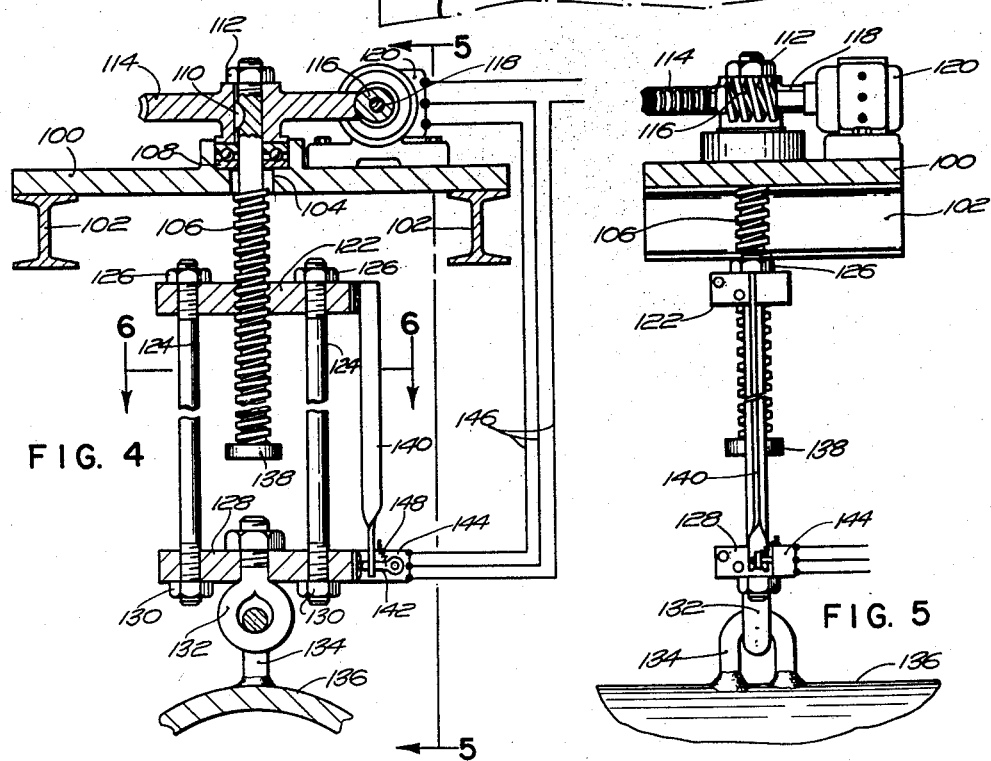
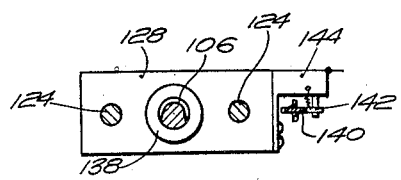
INVENTOR.
ALFRED ZOLLINGER

United States Patent Office 2,962,249
Patented Nov. 29, 1960

2,962,249

CONSTANT SUPPORT HANGERS

Alfred Zollinger, Providence, R.I., assignor to Grinnell Corporation, Providence, R.I., a corporation of Delaware Filed June 12, 1957, Ser. No. 665,330

10 Claims. (Cl. 248—58)

This invention relates to improvements in constant support hangers.

An object of the present invention is to provide an improved, compact, efficient and relatively inexpensive constant support hanger, and more particularly such a hanger in which the effective length of the hanger is automatically adjusted in response to changes in force exerted on the hanger by the load to compensate for such changes in force and maintain the support constant. Another object is to provide a constant support hanger in which such changes in force cause relative movement in one part of the hanger with respect to another, in which such relative movement actuates a length adjusting mechanism to change the length of the hanger to compensate for the changes in force and in which such relative movement is provided by the elongation and contraction of a tension rod in response to such changes in force. Preferably, one of such parts is supported by the other through the tension rod. Another object is to provide a constant support hanger in which such changes in force cause relative movement of one part of the hanger with respect to another part, in which such relative movement actuates a length adjusting mechanism to adjust the length of the hanger to compensate for the changes in force and in which such relative movement is provided by making a structural portion of the hanger through which one of such parts is supported by the other, contractable and expandible in response to such changes in force. Such structural portion is required in any event to perform the function of a structural member by supporting the load without exceeding the safe stress limits of the material employed and without excess distortion. By making it also perform the function of providing the relative movement referred to above the need for an additional element or elements to perform this function is eliminated. Another object is to provide a constant support hanger in which such changes in force applied by the load cause relative movement between two parts of the hanger, in which such relative movement is provided by a yieldable member through which one of such parts is supported by the other, and in which such yieldable member is so located with respect to the other parts of the hanger that it does not occupy any more vertical space than is already occupied and required by these other hanger parts. Preferably, the relative movement causes a screw member and nut member assembly to be actuated to change the length of the hanger to compensate for the changes in force and at least a part of the yieldable member is located alongside the threaded portion of the screw member. The yieldable member is preferably a tension rod. Another object is to provide a constant support hanger in which changes in force applied to the hanger by the load cause relative movement of one part of the hanger with respect to a fixed part, in which such relative movement actuates a mechanism for changing the length of the hanger to compensate for the changes in force and in which the mechanism for changing the length of the hanger is movable with the movable part and with respect to the fixed part in respone to such change in force. It is another object of the present invention to provide a constant support hanger in which a motor is utilized to change the length of the hanger to maintain constant support, which has a frame with a member thereon movable vertically with respect thereto to change the length of the hanger, which has a connection between said frame and fixed building structure, which has another connection between the movable member and the load and in which one of these connections also serves as yieldable means capable of being deflected and hence capable of providing relative movement between the two parts of the hanger in response to apparent changes in load to operate a switching mechanism for controlling the hanger. Another object is to provide a constant support hanger as described in which the connection serving to provide the relative movement is located within at least a part of the vertical space traversed by the movable member in traveling between its extreme vertical positions. Other objects will appear hereinafter.

The accompanying drawings show and the following specification describes preferred embodiments of the present invention. However, these are illustrative of the invention which is not intended to be limited to them.

In the accompanying drawings:

Fig. 1 is a cross-section front elevation view of a preferred form of the present invention;

Fig. 2 is a side elevation view of the device in Fig. 1 taken on line 2—2 of Fig. 1;

Fig. 3 is a plan view taken on line 3—3 of Fig. 1;

Fig. 3A is an enlarged diagrammatic view of the switching mechanism of Fig. 1 with a portion of the switch casing cut away;

Fig. 4 is a cross-sectioned front elevation view of another form of the present invention;

Fig. 5 is a sectioned side elevation view of the device shown in Fig. 4 taken on line 5—5 of Fig. 4; and Fig. 6 is a plan view taken on line 6—6 of Fig. 4.

Referring now more particularly to the embodiment shown in Figs. 1 to 3 of the drawings, the load to be supported by the hanger is designated by the numeral 10 and is shown as a section of a horizontally extending pipe. Such a pipe section is typical of loads which require support and at the same time must be free to move vertically within a limited range. The loads with which this invention is primarily concerned are those like the pipe section referred to which are in a piping system connected to fixed structure at one or more points remote from the point to which the hanger is attached so that when the latter point begins to move vertically, for example, upwardly due to changes in pipe temperature, the result is a decrease in the force exerted downwardly on the hanger by the weight of the pipe and the connections to the fixed structure at the remote points take over the support of this decrease in weight. Similarly if the movement of the point of hanger attachment is vertically downward the force exerted on the hanger will actually increase. In other words, typical loads for the hangers of the present invention exert varying downward forces on the hangers even though the weight of the load remains the same, and the change in force is in accordance with the vertical movement of the load from that position where the force just equals the load. For example, if the load moves vertically upward from the location where the force on the hanger just equals the load weight the force on the hanger decreases progressively, and conversely if the load moves downward from such location the force increases progressively. With such hangers a change in the effective length of the hanger between the point of attachment of the hanger to fixed structure and the point of attachment to the load also has the effect of varying the downward force exerted by the load on a hanger substantially in accordance with the amount of change of such effective length.

The hanger comprises a frame having an upper and lower end plates 12 and 14 connected by tension rods 16. The ends of these rods pass through the respective plates 12 and 14 and are provided with nuts 18. Suspension rods 20 having their lower ends secured to plate 12 by nuts 22 have their upper ends secured to fixed building structure (not shown). A motor 24 is mounted on the upper surface of the plate 14 and has its drive shaft 26 provided with a worm gear 28 which meshes with a worm wheel 30 also mounted on the plate 14 so as to rotate about a vertical axis. The hub 32 of this worm wheel has its lower face resting on an annular ball thrust bearing 34 which in turn rests on the upper surface of the plate 14 around an opening 36 in this plate. The worm wheel 30 is also provided with a threaded opening 38 which receives a screw member 40 having a stop 42 at its upper end and an eye connection 44 at its lower end. This eye connection engages the upper end 46 of a link 48 the lower end 50 of which in turn engages a bracket 52 welded to the pipe section 10.

The above described arrangement is such that when the motor operates the worm wheel 30 is rotated to move the screw member 40 vertically in the threaded worm wheel opening 38. This in turn causes the load to move vertically up or down depending upon the direction of rotation of the motor 24.

The tension rods 16 are at all times under tension by substantially the entire actual weight of the load 10 and are of such cross-sectional size, length and material that when the load 10 experiences a slight apparent increase in weight—i.e., 1% of the actual weight—due to vertical movement of the load downwardly to thereby increase the force applied by the load to the hanger and increase the tension on the rods, the length of the rods 16 changes by an amount sufficient to operate a switch 54 mounted on the plate 14. This switch 54 controls the operation of motor 24 in the following manner: When the weight of the pipe section 10 apparently increases due to downward pipe movement resulting from temperature changes, the downward force on the tension rods is increased and the rods 16 elongate causing a switch arm 56 on the switch 54 to rotate clockwise (see Fig. 1) on its pivotal connection 60 with the frame of switch 54. This switch arm is biased against the upper wall 57 of an aperture 57a in a fixed element 58 by a tension spring 59. This fixed element 58 has its upper end secured to the upper end plate 12. When this apparent weight increase reaches some predetermined percentage of the actual weight of the pipe section, for example 1% of this weight, the movement of the switch arm 56 is sufficient to operate the switch and turn on the motor 24 to drive the screw member 40 downwardly. Such downward movement of the screw member 40 tends to decrease the apparent weight of the section 10 on the plate 14 and the rods 16 begins to contract. This contraction causes the switch arm 56 to be rotated counterclockwise by the wall 57 of the aperture in the fixed element 58, and the motor 24 continues to drive the screw member 40 downwardly until the switch arm 56 has thus rotated counterclockwise far enough to operate the switch 54 to shut off the motor 24. The switch is arranged so that the motor 24 is shut off when the length of the rods 16 again indicates that the actual weight of the load is being exerted downwardly on the hanger.

When the weight of the pipe section 10 apparently decreases due to upward pipe movement resulting from temperature changes, tension on the rods 16 is decreased and they contract causing the upper wall 57 of the aperture in the fixed element 58 to push the switch arm 56 downwardly and to rotate this switch arm in a counterclockwise direction about its pivot 60. The switch 54 is arranged so that when the contraction of the rods 16 indicates that the apparent load weight has decreased by about 1% of the actual load weight due to such thermal movement of the piping the arm 56 operates electrical contacts to turn the motor on and cause the screw member 40 to be lifted up. Such lifting of the screw member 40 has the effect of increasing the downward force exerted by the load on the end plate 14, and the rods 16 begin to elongate under this increase in force. The elongation permits spring biased switch arm 56 to again rotate in a clockwise direction and turn off the motor when the tension in the rods 16 indicates that the actual weight of the load is once more being exerted downwardly on a screw member 40.

Fig. 3a is an enlarged view of the switching mechanism 54 shown in Fig. 1 and illustrates one arrangement which operates satisfactorily. The switch arm 56 is mounted on a pivot shaft 60 which is journalled on the switch casing and which also carries a large diameter segment gear 62 which meshes with a small diameter segment gear 64 mounted on a pivot 65 and having a switch arm 66. The spring 59 which biases the switch arm 56 against the upper wall 57 of the aperture in the fixed element 58 also serves to hold the switch arm 66 in continuous contact with two plunger piston elements 70 and 72 which are spring loaded downwardly against this arm by springs 74 and 76, respectively, housed in the ends of cylinders 77 and 78 in which the plungers are mounted. Plunger 70 has one end of a tension spring 79 secured thereto at a point 80, the other end of this spring being secured at a point 82 to the outer end of a lever arm 84 pivoted to the fixed cylinder at 86. As shown in Fig. 3a the line defined by points 82 and 86 is located so that the spring 79 biases the lever 84 downwardly against a stop 90 and it is not until the plunger 70 is moved upwardly far enough to carry point 80 above a point A on a continuation of the line 82—86 that the spring 79 will move the lever 84 upwardly against a contact 92. The lever 84 and the contact 92 complete an electric circuit which starts the motor 24 to drive the screw member 40 downwardly. This motor operation will continue until the point 80 on the plunger 70 has moved downwardly far enough to carry point 80 below a point B on a continuation of line 82'—86, at which time spring 79 will snap lever 84 against stop 90. This differential of movement between points A and B is selected to be approximately that distance through which the plunger 70 is moved when the force exerted by the load downwardly upon the end plate 14 exceeds the actual weight of the load by 1%.

The other plunger 72 is arranged with a similar lever 94, shown bearing against a stop 95, and with a spring 96 attached to the lever at 97 and to the cylinder at 99 to move the lever over against a contact 98 and close a circuit driving the motor in the opposite direction (to move screw member 40 up) when point 99 moves below the dead center position shown at point C. Thereafter operation of the motor will continue until the plunger 72 has risen and the point 99 has passed through the new dead center position at point D established by the new position by the lever 94 against stop 98.

Referring now to Figs. 4 to 6, the embodiment shown there resembles that previously described except that the worm wheel is fixed to the screw member which carries a nut member movable vertically along the screw member when the worm wheel is rotated. More particularly this embodiment has a frame 100 resting, for example, on I-beams 102 which may be building frames. The frame is provided with an opening 104 therein to accommodate a screw member 106 which passes up through this opening through an annular ball thrust bearing 108 and is secured by a key 110 and a nut 112 to a worm wheel 114. This worm wheel is driven by a worm wheel gear 116 mounted on the shaft 118 of a reversible electric motor 120 which is mounted on the upper surface of the frame 100. The portion of the screw member 106 which extends below the frame is threaded and receives thereon a nut member 122 which has depending therefrom tension rod members 124 with their upper ends secured to the nut member by nuts 126 and with their lower ends secured to a cross-head 128 by similar nuts 130. The cross-head engages the upper end of a suitable connection 132 the lower end of which in turn engages a bracket 134 welded to a pipe section 136 constituting the load. The lower end of the threaded screw member is provided with a stop 138 so that the nut 122 will not be accidentally turned off the end of this screw member. In addition the nut member 122 carries the upper end of a fixed element 140 the lower end of which engages the pivoted arm 142 of a switch mechanism 144 which is of the same construction as switch 54 of Fig. 1 and which is secured to a cross-head 128. Electrical leads 146 lead from this switch mechanism to the motor 120 and to a convenient power supply (not shown). The switch arm 142 is biased against the upper wall of an aperture in the fixed element 140 by a spring 148 in the same manner as the arm 56 in Fig. 1.

The operation of this embodiment is very much like the operation of the embodiment of Figs. 1 to 3a. As the apparent weight of the load increases due to thermal movement of the pipe section downwardly the tension rods 124 elongate actuating the switch arm 142. When this switch arm has rotated a predetermined distance the switch in the switch mechanism 144 is actuated to turn on the motor in a direction to drive the nut 122 downwardly on the screw member 106. This has the effect of decreasing the force of the downwardly moving load on the tension rods 124 so that these rods contract and the switch arm 142 rotates in the opposite direction until such downward movement of the nut 122 allows the switch arm to shut off the driving motor 120. Similarly when the apparent weight of the load decreases due to thermal movement of pipe section upwardly the operation is the same except that the switch arm turns the motor on to drive the nut 122 upwardly. The details of a suitable switch mechanism 144 need not be given here, it being understood that a switch like that shown in Fig. 3a may be employed.

It will be seen from the description thus far that in both of these embodiments structural members which are necessary to provide the proper support of the load and to allow for the proper movement thereof are caused to perform the additional function of providing a limited amount of relative movement between 12 and 14 in Fig. 1 and between 122 and 128 in Fig. 4 to actuate the motor in response to apparent changes in load. Thus, more particularly, it will be seen that in the arrangement of Fig. 1 regardless of how the motor is actuated in response to apparent changes in load it is necessary that the frame plates 12 and 14 or their equivalents be separated by approximately the length of the threaded screw member 40, this length being therefore necessary in the hanger construction. Some members connecting these two frame plates or their equivalents together will be required in any event, and by the present invention such connecting support members are caused to perform the additional function of permitting a limited amount of relative movement of the frame plates with relation to each other to the motor operation. Similarly, referring to the embodiments of Figs. 4 to 6, it will be seen that members depending from the threaded portion of the nut member 122 must be at least as long as the threaded portion of the screw member 106, and accordingly there will be required in any arrangement of this type structural members approximately as long as the tension members 124. In accordance with the present invention these members serve the additional function of providing relative movement of the frame plates with relation to each other to control the motor.

In addition to utilizing structural portions which are required in any event to provide relative movement to actuate the motor, the overall vertical space required by the device may be kept to a minimum by locating these structural members so that they overlap members which are required to occupy vertical space, as for example, the threaded portion of the screw member. Thus the rods are not added on to the total length of the device. The results in saving of vertical head-room in such a case is substantial and of considerable advantage.

Because the relative movement of the lower ends of the fixed elements 58 and 140 with respect to the switch arms 56 and 142 are quite small changes in the temperature of the air around the hanger could conceivably cause the tension members and the fixed elements to change their lengths by different amounts. In view of this possibility it is preferred that the material and cross-sectional dimension of the tension rods and of the fixed elements be selected so that for a given change in the temperature in the air around the hanger the change in length of the tension rods and of the fixed elements would be such that no substantial relative motion between the fixed elements and the switch arms would result from such temperature changes.

Three tension rods made from Super Strength steel (tensile strength of from 260,000 to 340,000 pounds per square inch) each having a cross sectional dimension of ⅝ of an inch in diameter and a length of 40 inches have been found to be suitable for hangers adapted to support a load of about 60,000 pounds. The particular tension rod material and dimensions are not critical so long as they permit the desired amount of relative movement between plates 12 and 14 and between plates 122 and 128 and will properly support the load for which the hanger is designed, and they are selected in accordance with the designed load range of the hanger and the amount of relative movement desired between plates 12 and 14 in the case of Fig. 1 and between plates 122 and 128 in the case of Fig. 4.

Plate 14 in Fig. 1 and plate 128 in Fig. 4 comprise supported members for supporting the load and are in turn supported by the anchor member or means 12 in Fig. 1 and 100 in Fig. 4 through tension rods 16 in the case of Fig. 1 and tension rods 124 in the case of Fig. 4. The screw member 40 and nut 30 in Fig. 1 and screw member 106 and nut 122 in Fig. 4 comprise means for adjusting the length of the hanger between the load and anchor member 12 in the case of Fig. 1 and between the load and anchor member 100 in the case of Fig. 4. The motor comprises means for actuating the means for adjusting the length of the hanger. The manner in which the supported member is mounted on the anchor member by the tension rods together with the rod 58 in Fig. 1 and rod 140 in Fig. 4 and the switch comprise means responsive to changes in force applied to the supported member by the load to actuate the motor and hence change the length of the hanger. The tension rods comprise yieldable members through which the supported member is supported by the anchor member and are located alongside the threaded portion of the screw member in the case of both embodiments. In the case of Fig. 1 the tension rods form a part of the frame and in all figures they comprise structural members. In Fig. 1 the means for lengthening the hanger (screw member and nut) and the motor are mounted on and move with the supported member and with respect to the anchor member in response to changes in force applied by the load, whereas in Fig. 4 they are mounted on the anchor member and are not movable with the supported member in response to such changes in force. The tension rods provide for relative movement between the supported member and the anchor means, the length adjusting means being controlled by such relative movement. In the case of Fig. 1 the nut is rotated by the motor and imparts straight line motion to the screw member to which the load is attached, while in Fig. 4 the screw member is rotated by the motor and imparts straight line motion to the nut to which the load is attached. The screw member and nut assembly comprise a jack or jack means.

I claim:

1. A constant support hanger comprising a frame having an anchor frame member adapted to be secured to fixed structure, a load supporting member supported by said anchor frame member, a yieldable structural tension member through which said load supporting member is supported by said anchor frame member and providing relative movement between said load supporting member and said anchor frame member in response to changes in force applied to said load supporting member by a load, means for adjusting the length of said hanger between said anchor frame member and the load including jack means, means for actuating said length adjusting means in response to said relative movement to thereby change the length of the hanger to compensate for said changes in force, at least a substantial portion of said yieldable structural tension member being located along side said jack means.

2. A hanger according to claim 1 wherein said jack means comprises a screw member and nut assembly, at least a substantial portion of said yieldable structural member being located along side the threaded portion of said screw member.

3. A constant support hanger comprising a frame having an anchor frame member adapted to be secured to fixed structure, having a movable frame member and having a plurality of yieldable tension members through which said movable frame member is supported by said anchor frame member, a load supporting member supported by said movable frame member and adapted to engage a load, said yieldable tension members providing relative movement between said anchor and movable frame members in response to changes in force applied to said load supporting member by the load, means for adjusting the length of said hanger between said movable frame member and the engagement of said load supporting member with a load, means for actuating said length adjusting means in response to said relative movement to thereby change the length of the hanger to compensate for said changes in force.

4. A constant support hanger comprising a frame having an anchor frame member adapted to be secured to fixed structure and having an additional frame member, a load supporting member adapted to engage a load, a structural tension member connecting said additional frame member to said anchor frame member, another structural tension member connecting said load supporting member to said additional frame member, said additional frame member including means for adjusting the length of said hanger between said additional frame member and the engagement of said load supporting member with a load, said length adjusting means extending along a substantial part of the total length of the hanger, at least one of said structural connecting tension members having a substantial portion coextensive with at least a portion of said length adjusting means along the length thereof and being adapted to be elongated and contracted in response to changes in force applied to said load supporting member by a load to provide relative movement between said load supporting member and said anchor frame member, and means for actuating said length adjusting means in response to said relative movement to thereby change the length of the hanger to compensate for said changes in force.

5. A constant support hanger comprising a frame having an anchor frame member adapted to be secured to fixed structure, a load supporting member supported by said anchor frame member, a tension rod through which said load supporting member is supported by said anchor frame member, means for adjusting the length of said hanger between said anchor frame member and a load connected to said load supporting member, means for actuating said length adjusting means, said tension rod being adapted to be elongated and contracted in response to changes in force applied to said load supporting member and hence to said tension rod by a changing load thereby providing relative movement of said load supporting member with respect to said anchor frame member in response to the changes in a load, means responsive to said relative movement of said load supporting member for automatically actuating said length adjusting means and thereby changing the length of said hanger to compensate for said changes in force.

6. A hanger according to claim 5 wherein said means for adjusting the length of said hanger includes a screw member and nut assembly, at least a substantial portion of said tension rod being located alongside the threaded portion of said screw member.

7. A hanger according to claim 6 wherein said means for actuating said length adjusting means comprises a motor for rotatably driving one of said screw member and nut to impart straight line motion to the other.

8. A hanger according to claim 5, wherein said hanger has a movable frame member, said tension rod connecting said movable frame member to said anchor frame member.

9. A hanger according to claim 5 wherein said means for adjusting the length of the hanger and said means for actuating said length adjusting means are supported by said anchor frame member through said tension rod and are movable with said load supporting member in response to said changes in force.

10. A hanger according to claim 5 wherein said means for adjusting the length of said hanger includes a screw member and a cooperating nut and wherein said load supporting member is suspended from one of said nut and said screw member by said tension rod, whereby said load supporting member is movable with respect to said one of said nut and said screw member by the elongation and contraction of said rod in response to said load changes, the other of said nut and screw member being rotated by said means for actuating said length adjusting means, to impart straight line motion to said one of said nut and screw member.

References Cited in the file of this patent
UNITED STATES PATENTS

| | | |
|---|---|---|
| 1,726,244 | Shefstead | Aug. 27, 1929 |
| 2,248,730 | Wood | July 8, 1941 |